Patented Apr. 28, 1936

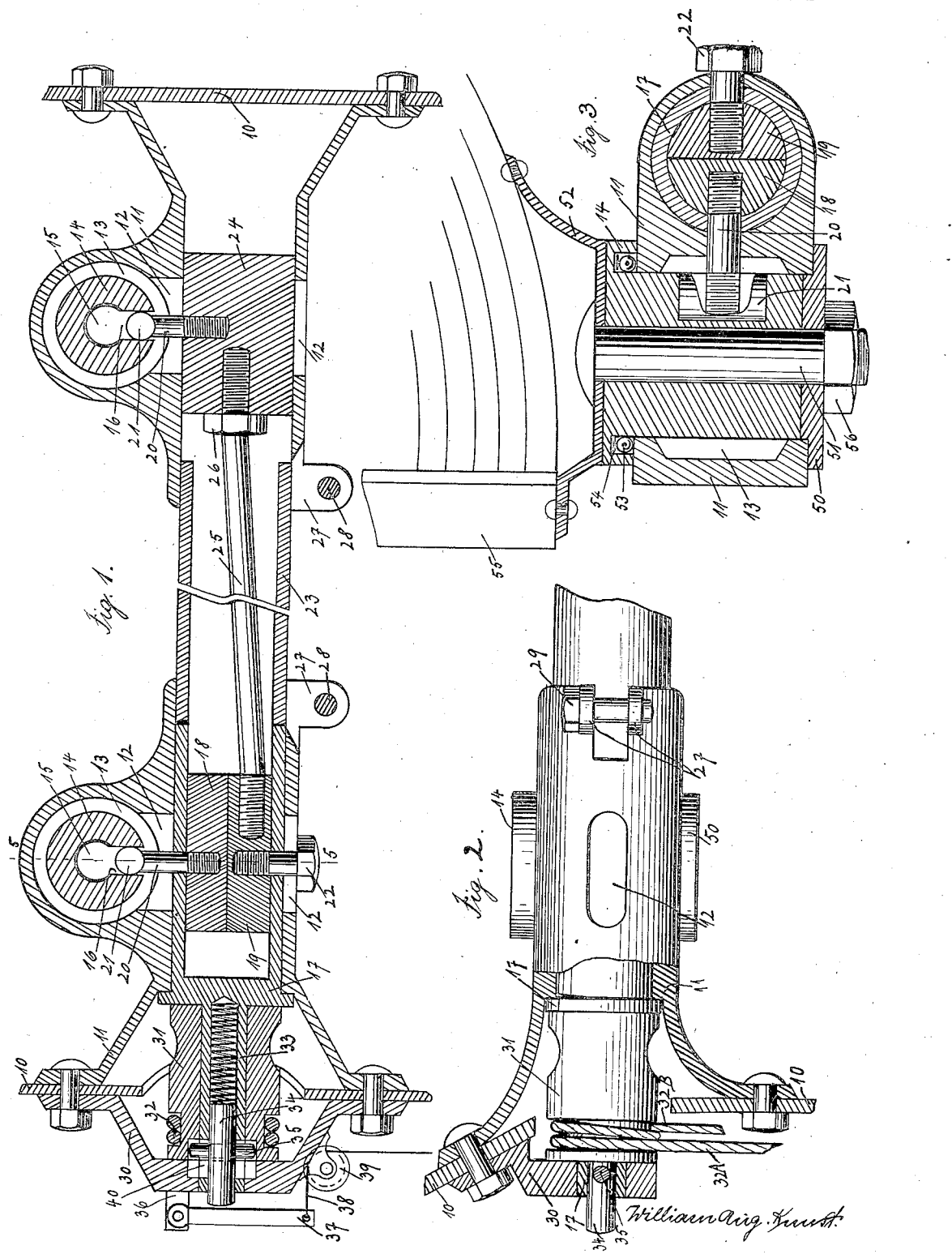

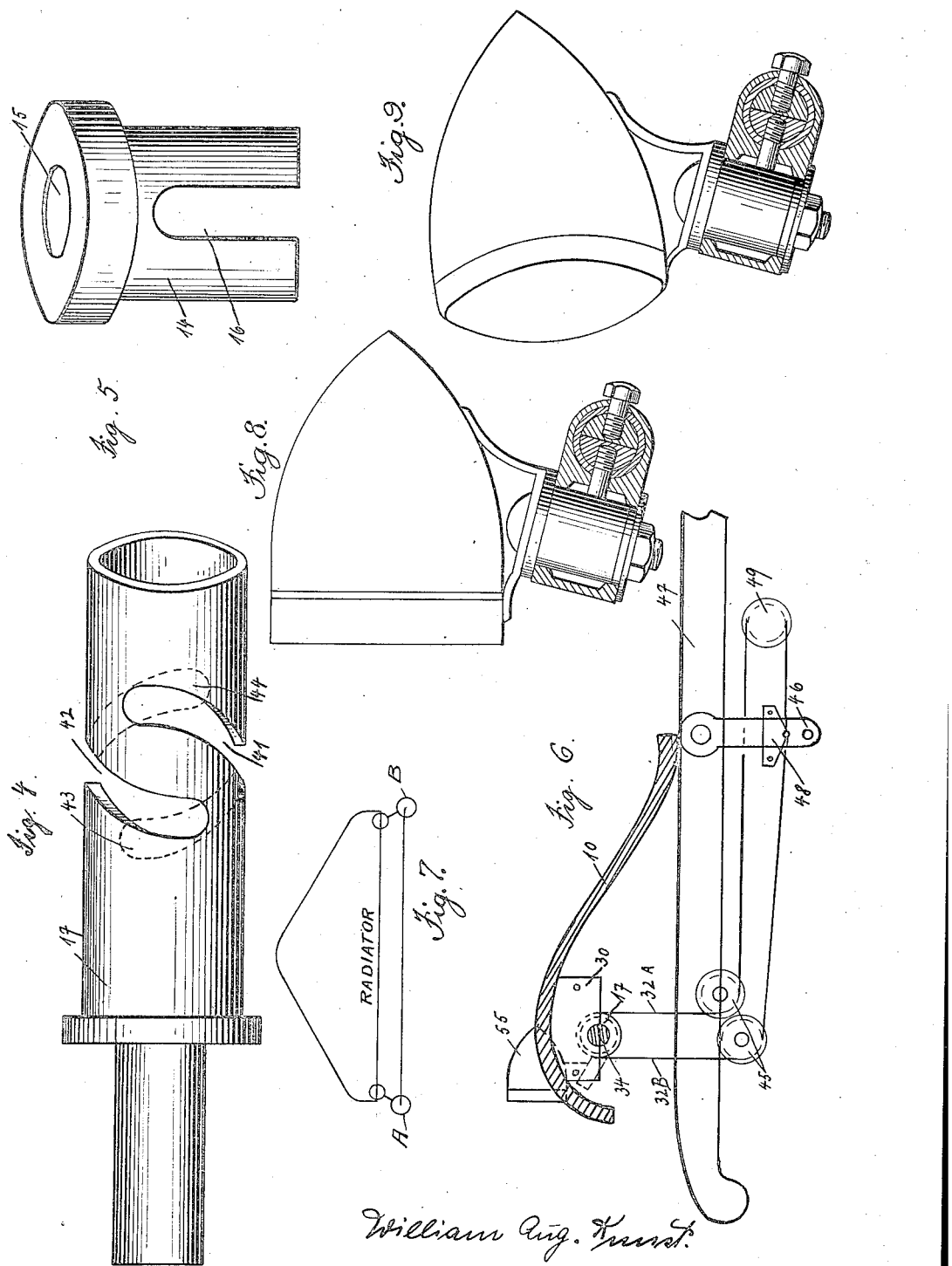

2,039,253

UNITED STATES PATENT OFFICE 2,039,253

DIRIGIBLE HEADLIGHTS FOR AUTOMOBILES

William August Knust, Hoboken, N. J.

Application June 25, 1932, Serial No. 619,340

6 Claims. (Cl. 240—62)

This invention is an improvement in dirigible headlights for automobiles and has for an object the provision of a simple compact mechanism which is operated automatically by the steering mechanism.

Another object of the invention is the provision of mechanism to disconnect the headlight mechanism when desired.

A primary object of the invention is to turn the headlights simultaneously to different angles on vertical axes, or to turn and tilt them to the mentioned angles and different degrees on axes which are held at an angle to the headlights. The mechanism with which these turns are accomplished will be described hereafter.

With the above and other objects in view the invention further includes the following novel features and details of construction, to be hereinafter more fully described, illustrated in the accompanying drawings and pointed out in the appended claims.

In the drawings:—Fig. 1 is a cross-sectional view of the whole device mounted on the fenders. Fig. 2 the bracket of the steering side secured to the fender looking toward the cylinder and pulley. Fig. 3 is a cross-sectional view of the bracket on steering side on the line 5—5. Fig. 4 is a cylinder. Fig. 5 is a bushing as it appears in this device. Fig. 6 is a connection from the steering means to the device. Fig. 7 is a connection behind the radiator to provide a modern automobile with this device. Fig. 8 shows one headlight in central position. The turning axis (the bushing) of the headlight is held at an angle to the face of the light. Fig. 9 shows the same light turned out of its central position into an angular position. The light appears by one operation of the means turned and tilted.

In detail in the drawings:—10 designates the customary fenders on which the device is mounted. 11 indicates two brackets preferably made of cast-steel; they are shaped on the outer side to obtain a firm support on the fenders. The brackets are provided with a double slot 12 and two bores located at an angle of 90° to each other in which the entire means to operate the headlights is placed. To distinguish the bores from each other the longitudinal bore will be called the horizontal bore and the one at an angle thereto the vertical bore. The brackets are further provided on their inner side with ears 27 which have holes 28, the bottom holes threaded, in each of which a screw 29 is placed securing the sleeve 23 on the inner side to the brackets. 13 indicates a recess in each of the vertical bores of the brackets and made to allow a turn of 45 degrees of the lights. 14 designates two rotatable bronze bushings, one for each of the vertical bores of the brackets. The bushings are provided with a hole 15 in which the headlight studs which secure the headlights to the bushings are disposed. The bushings are also provided with an open slot 16 in which means to rotate the same is disposed. The shoulder of each bushing is provided with a recess in which balls 53 and a flat curved spring 54 are disposed. These balls and springs have to be applied only when necessary to prevent bushings from rattling. 17 indicates the cylinder which is preferably made of cold rolled steel. The cylinder is rotatable in the horizontal bore of the bracket which is mounted on the steering side. This cylinder is provided with two spiral slots lying in opposite position. It will be observed here (Fig. 4) that each of the slots has two portions 41 and 42 which are alike in pitch and two other portions 43 and 44 which also are alike in pitch but that two of the portions in each slot are different in pitch and that these portions from their connecting or corresponding points operate in reversed direction to each other. The bore of the cylinder (Fig. 1 and Fig. 3) is provided with two half-round sliding members 18 and 19. A third round sliding member 24 is disposed in the horizontal bore of the bracket opposite the cylinder. These three sliding members are provided with threaded holes in which connecting mechanism is secured. It will be observed that the members 18 and 24 are provided with studs 20 to which pins 21 are secured. Member 19 is provided with a screw 22 and a rod 25 which last mentioned rod is extended and attached by thread to the member 24. Locknut 26 secures the member 24 to the rod 25. 55 indicates a headlight, 52 the hub and 51 the stud of the headlight.

The cylinder is extended through the fender and supported by the bracket 30. The extension is provided with an axial bore and radial slots in which disconnecting mechanism such as spring 33, pin 34 and radial pin 35 are disposed. There is also a pulley 31 fitted to this extension and held in position by the bracket 30 and the shoulder of the cylinder. The pulley and the bracket 30 are both provided with radial grooves and indicated as 40. These grooves and radial slots in the extension are for adaption of the terminals of radial pin 35 therein.

The pulley 31 is provided with a cable 32 and the ends of this cable 32A and 32B are extended over pulleys 45 and 49 to clamp 48 and secured thereto. As shown in Fig. 6 the clamp 48 is mounted on the steering lever 46 on chassis 47.

To operate the disconnecting mechanism from the driver's seat a small reversing lever should be mounted to the dashboard. The flexible wire 38 which is fastened to the arm 37 should be extended over pulley 39 and other pulleys to the reversing lever and fastened here also. When this lever is moved in one direction it appears that the arm 37 which is moveable on the ear 36 on bracket 30 will be moved by the spring 33 and pin 34 outwardly. The terminals of radial pin 35 will then be disposed in the grooves 40 in the bracket 30 and the headlight mechanism disconnected from the steering mechanism. Moving the lever in the other direction arm 37 will move the terminals of radial pin 35 by the terminal of pin 34 into the grooves 40 in the pulley 31 and engage the headlight mechanism with the steering mechanism.

The turning of the lights on vertical axes is acomplished as it is shown in Fig. 3. The face of the headlight and its turning axis (the bushing) appear both parallel and vertical.

The combined turning and tilting of the lights is accomplished in tilting the front face of each bracket ten to fifteen degrees upwardly but keeping the face of the headlights in central position also "vertical" as it is shown in Fig. 8 of the accompanying drawings. The offset or angle which appears here between the headlight and its turning axis (the bushing) makes it possible that when each headlight is turned out of its central position into an angular position it is not only turned but also tilted as it is shown in Fig. 9 of the accompanying drawings.

To assemble this device it is required to provide first the member 19 with rod 25. Place this member 19 with the member 18 into the bore of the cylinder. Then push the cylinder into the horizontal bore of its bracket. Slip the sleeve 23 over rod 25 into the bracket as shown in Fig. 1 and fasten with screw 29 the bracket to the sleeve. Apply nut 26, screw the member 24 to rod 25 and secure with nut 26 the last mentioned member to rod 25. Add the second bracket. The member 24 appears then in the horizontal bore of this bracket and the sleeve is then also as shown in Fig. 1 connected with this bracket. Tighten this bracket by screw 29 to the sleeve. Secure screw 22 to the member 19, passing with screw 22 the horizontal rear slot 12 in this bracket and one of the spiral-slots in the cylinder. Screw the two studs 20 with pins 21 to the members 18 and 24, passing on the cylinder side through the inner slot 12 of this bracket and the second spiral slot in the cylinder and in the opposite bracket the slot 12 next to the vertical bore. Place then the bushings in the vertical bores of the brackets. In doing so it will be observed that the pins 21 are covered by the open slots of the bushings. The rest of the assemblage is common.

If the device is now properly assembled and secured in the tilted position, as described, to the fenders it is only required to place into each hole of the bushing the stud of the headlight. Slip the washer 50 (Fig. 3) on each stud and secure with nut 56 the headlights, vertical and parallel to the longitudinal axis of an automobile, to the bushings. Connect the device so to the steering lever that the light next to the curve operates in its turning position at an angle of 90° with the front wheels.

When then the steering wheel is operated to turn the wheels as for movement to the left the cylinder (Fig. 1 and Fig. 4) starts rotating. And while the device operates from the corresponding points of portions of the spiral slots it will be observed that screw 22 moves into the portion 41 of the spiral slot, and stud 20 opposite screw 22 will move into the portion 44 of the other spiral slot. While portion 44 has more pitch than portion 41 it will be observed that the headlight connected to portion 44 is turned at a greater angle and tilted more than the headlight connected to portion 41. For a right turn the procedure is the reverse. Screw 22 will move into the portion 43 of this spiral slot and stud 20 opposite the screw 22 moves into the portion 42 of the other spiral slot. Portion 43 is indicated as one of the portions with more pitch, therefore, the headlight connected to this portion is turned at a greater angle and tilted more degrees than the light connected to portion 42.

If the device is secured to the fenders as it is shown in Fig. 3 of the drawings the lights will turn simultaneously to different angles only, without tilting.

The turns as they are described here are based upon the principle to make the crossing portion of the rays or beams of two headlights profitable and illuminate thereby the curves as much as possible. This can be arranged as follows:

Provide the cylinder with the two greater pitched portions of the spiral slots. Assemble the device so far that when the same is mounted on the fenders and connected to the steering mechanism the headlight on the steering side operates at an angle of 90° with the front wheels. Turn then the wheels with this one headlight to their limit. Adjust the second headlight so that the inner beam of this light meets the inner beam of the turned light. Indicate on the cylinder the desired pitch of the portion of the spiral slot which turns the outward light. Provide the cylinder with both of these portions in connection with the present portions. Reassemble the device complete and turn both lights automatically by the steering mechanism. It will then be observed that with every movement of the wheels the light beams will have a wider lateral spread at the curve.

While headlights are not standardized the crossing portion of the rays or beams in the various types of lights will be different. But considering here the different types of lights the pitch of the portions of the slots which turn the outward lights must be determined to the above mentioned adjustment.

The tilting of the lights as it is stated before is arranged by keeping the face of the headlights at an angle to their turning axes. The tilting to different degrees is produced in conjunction with the turns of the lights by the means of spiral slots as described. Considering the combined turning and tilting, the rays of the lights will not only be more laterally spread at the curves, but also in a closer form which is shaped to an irregular rectangle, nearer to the curve and wider on the outer side.

To provide a modern automobile with this device it is only required to arrange the brackets so that they can be fastened to the fenders and radiator. Apply a suitable connection behind the radiator and connect member 19 with point A and member 24 with point B. The sleeve 23 will in this arrangement not be necessary.

Having described this invention fully what is claimed as new and desired to be secured by Letters Patent is:—

1. In combination with an automobile, a pair of headlights simultaneously turnable into different angular positions on vertical axes, and mechanism for connecting said headlights to the steering mechanism, said mechanism consisting of a rotatable cylinder having two spiral slots each consisting of two differently pitched portions which operate from their connecting or corresponding points in such a manner that a portion of greater pitch turns the headlight next to the curve at a greater angle than the headlight on the outer side of the curve is turned, and that a portion of less pitch turns the headlight on the outer side of the curve at a lesser angle than the headlight next to the curve is turned, substantially as described.

2. In combination with an automobile, a pair of headlights simultaneously turnable into different angular positions and tiltable to different degrees on axes which are held at an angle to the headlights, and mechanism for connecting said headlights to the steering mechanism, said mechanism consisting of a rotatable cylinder having two spiral slots each consisting of two differently pitched portions which operate from their connecting or corresponding points in such a manner that a portion of greater pitch turns the headlight next to the curve at a greater angle and tilts it more degrees than the headlight on the outer side of the curve is turned and tilted, and that a portion of less pitch turns the headlight on the outer side of the curve at a lesser angle and tilts it to lesser degrees than the headlight next to the curve is turned and tilted, substantially as described.

3. In a device of the character described, a cylinder having two spiral slots and two half-round sliding members, the said cylinder being rotatably mounted in a horizontal bore of a fender bracket, one of the said half-round sliding members being connected with one of the said spiral slots in the cylinder by means of a stud to which a pin is secured connecting an open slot in a rotatable bushing disposed in a vertical bore of the fender bracket opposite the cylinder, the second half-round sliding member being provided with a screw and a rod, the screw passing through the second spiral slot of the cylinder, the rod being extended to a third round sliding member disposed in a horizontal bore of a second fender bracket, the said round sliding member being provided with a stud to which a pin is secured connecting also an open slot in a second rotatable bushing disposed in a vertical bore of the second fender bracket, and mechanism connecting the steering mechanism of an automobile with the said cylinder mechanism to operate the same, substantially as described.

4. In a device of the character described, bushings, each having an open slot and a hole, each bushing being rotatably mounted in a vertical bore of a fender bracket, the hole of each bushing being provided with a headlight stud securing a headlight to the bushing, the open slot of each of said bushings being provided with mechanism connecting operatively spiral slots in a cylinder also disposed in one of the fender brackets, and mechanism connecting the steering mechanism of an automobile with the said bushings to rotate the same whereby the headlights are turned or turned and tilted, substantially as described.

5. In a device of the character described, a cylinder having an extension provided with disconnecting mechanism and a bracket and a pulley, the bracket and the pulley having grooves, the disconnecting mechanism consisting of a spring and a radial and an axial pin, the bracket supporting the extension on its outer end, the pulley adapted to be connected to the steering mechanism by means of a cable, the terminals of said radial pin being adapted to engage the grooves in said bracket to disconnect the headlight mechanism from the steering mechanism, or to engage the grooves in said pulley to operate the headlight mechanism by the steering mechanism, substantially as described.

6. In a device of the character described, a pair of brackets, each having a double slot and a horizontal and a vertical bore, the brackets being shaped on their outer sides to obtain a firm support at the fenders and on their inner sides being connected by a sleeve, one of the horizontal bores of said brackets to be provided with a rotatable cylinder having spiral slots, the other horizontal bore to be provided with a round sliding member, the vertical bores of the brackets being provided with rotatable bushings having open slots, the double slots of said brackets and the spiral slots in the cylinder being provided with mechanism connecting operatively the open slots of the bushings, substantially as described.

WILLIAM AUGUST KNUST.